United States Patent
Nishimine

(10) Patent No.: US 10,232,838 B2
(45) Date of Patent: Mar. 19, 2019

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventor: Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/685,423

(22) Filed: Aug. 24, 2017

(65) Prior Publication Data

US 2018/0065618 A1 Mar. 8, 2018

(30) Foreign Application Priority Data

Sep. 7, 2016 (JP) ................................. 2016-175081

(51) Int. Cl.

| B60W 30/182 | (2012.01) |
|---|---|
| B60W 10/10 | (2012.01) |
| B60W 30/18 | (2012.01) |
| B60W 50/00 | (2006.01) |
| F16H 61/02 | (2006.01) |
| F16H 61/04 | (2006.01) |
| B60W 10/115 | (2012.01) |
| B60W 30/19 | (2012.01) |
| F16H 59/02 | (2006.01) |

(52) U.S. Cl.
CPC .......... *B60W 10/10* (2013.01); *B60W 30/182* (2013.01); *B60W 30/18009* (2013.01); *B60W 50/0098* (2013.01); *F16H 61/02* (2013.01); *F16H 61/0437* (2013.01); *B60W 10/115* (2013.01); *B60W 30/19* (2013.01); *B60W 2050/007* (2013.01); *B60W 2050/0062* (2013.01); *B60W 2710/023* (2013.01); *F16H 2059/0226* (2013.01)

(58) Field of Classification Search
None
See application file for complete search history.

(56) References Cited

U.S. PATENT DOCUMENTS

| 5,906,645 A | 5/1999 | Kagawa et al. | |
| 2016/0347314 A1* | 12/2016 | Kuwahara | B60W 30/182 |
| 2017/0335949 A1* | 11/2017 | Roelle | B60W 30/18163 |

FOREIGN PATENT DOCUMENTS

JP H09-222922 A 8/1997

* cited by examiner

*Primary Examiner* — Justin Holmes
(74) *Attorney, Agent, or Firm* — Oliff PLC

(57) ABSTRACT

A control device for a vehicle, the vehicle includes a transmission provided in a power transmission path between a drive power source and drive wheels. The control device includes an electronic control unit configured to i) shift the transmission according to traveling conditions, ii) switch a driving mode for running the vehicle between autonomous driving under autonomous driving control, and manual driving based on driving operation of a driver, and iii) shift the transmission such that a shift time required for shifting of the transmission during the manual driving is shorter than a shift time required for shifting of the transmission during the autonomous driving.

6 Claims, 7 Drawing Sheets

FIG. 3

|      | C1 | C2 | C3 | C4 | B1 | B2 |
|------|----|----|----|----|----|----|
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8th  |    | O  |    |    | O  |    |
| Rev  |    |    | O  |    |    | O  |

O: ENGAGED   BLANK: RELEASED

CONTROL DEVICE AND CONTROL METHOD FOR VEHICLE

INCORPORATION BY REFERENCE

The disclosure of Japanese Patent Application No. 2016-175081 filed on Sep. 7, 2016 including the specification, drawings and abstract is incorporated herein by reference in its entirety.

BACKGROUND

1. Technical Field

The disclosure relates to a control device and a control method for a vehicle capable of shifting a transmission, and switching between autonomous driving and manual driving.

2. Description of Related Art

A traveling control unit of a vehicle adapted to be switched between autonomous driving under autonomous driving control and manual driving based on driving operation of a driver is known well in the art. One example of this type of traveling control unit is an auto-drive control unit for a vehicle as described in Japanese Patent Application Publication No. 9-222922 (JP 9-222922 A). A vehicle described in JP 9-222922 A can be switched between an autonomous driving mode in which autonomous traveling is performed by controlling the vehicle speed and the steering angle based on signals from various sensors, and a manual driving mode based on driving operation of the driver.

SUMMARY

In the meantime, in a vehicle including a transmission that provides a part of a power transmission path between a drive power source and drive wheels, the transmission is shifted up or down according to traveling conditions. If the shifting of the transmission is performed in the same manner during autonomous driving and during manual driving, for example, if shift control is performed with an emphasis placed on suppression of shock, smooth shifting suitable for autonomous driving may be achieved, but there is a possibility that the transmission is shifted with poor response, against the intention of the driver, during manual driving.

This disclosure is a control device and a control method for a vehicle capable of shifting a transmission in a manner suitable for each of autonomous driving and manual driving.

According to one aspect of the disclosure, the disclosure includes a control device for a vehicle. The vehicle includes a transmission provided in a power transmission path between a drive power source and drive wheels. The control device includes an electronic control unit configured to i) shift the transmission according to traveling conditions, ii) switch a driving mode for running the vehicle between autonomous driving under autonomous driving control, and manual driving based on driving operation of a driver, and iii) shift the transmission such that a shift time required for shifting of the transmission during the manual driving is shorter than the shift time required for shifting of the transmission during the autonomous driving. According to one aspect of the disclosure, the disclosure includes a control method for a vehicle. The vehicle includes a transmission provided in a power transmission path between a drive power source and drive wheels, and an electronic control unit. The control method includes i) shifting the transmission, by the electronic control unit, according to traveling conditions, ii) switching a driving mode for running the vehicle, by the electronic control unit, between autonomous driving under autonomous driving control, and manual driving under driving operation of a driver, and iii) shifting the transmission, by the electronic control unit, such that a shift time required for shifting of the transmission during the manual driving is shorter than a shift time required for shifting of the transmission during the autonomous driving.

According to the above aspect of the disclosure, if the vehicle is traveling in the manual driving mode when the transmission is shifted, the shift time required for shifting of the transmission is set to a shorter time than that in the case where the vehicle is traveling in the autonomous driving mode. Therefore, during autonomous driving, the shift time is relatively long, and shift shock is suppressed. During manual driving, on the other hand, the shift time is relatively short, and the shift response is improved. Accordingly, it is possible to improve the shift response during manual driving, while suppressing shift shock during autonomous driving. Namely, it is possible to achieve shifting of the transmission in a manner suitable for each of autonomous driving and manual driving.

The electronic control unit may be configured to shift the transmission such that the shift time when an accelerating operation amount of the driver is large during the manual driving is shorter than the shift time when the accelerating operation amount is small.

According to the above aspect of the disclosure, if the accelerating operation amount of the driver is large when the transmission is shifted during manual driving, the shift time is set to a shorter time than that in the case where the accelerating operation amount is small. Therefore, it is possible to shift the transmission with good response, according to the drive's intention to accelerate the vehicle.

The electronic control unit may be configured to shift the transmission when transmission path for forward traveling is established, such that the shift time during the manual driving is shorter than the shift time during the autonomous driving.

According to the above aspect of the disclosure, if the vehicle is traveling in the manual driving mode when the transmission is shifted when the power transmission path for forward traveling is established, the shift time is set to a shorter time than that in the case where the vehicle is traveling in the autonomous driving mode. Therefore, shift shock during forward traveling is suppressed during autonomous driving, while the shift response during forward traveling is improved during manual driving.

The electronic control unit may be configured to shift down the transmission into a condition where an effect of a drive power source brake using the drive power source is more strongly obtained when the power transmission path for forward traveling is established, such that change of rotational speed that increases with downshift of the transmission during the manual driving is larger than change of the rotational speed during the autonomous driving.

According to the above aspect of the disclosure, if the vehicle is traveling in the manual driving mode, when the transmission is shifted down into a condition where the effect of drive power source brake is more strongly obtained, when the power transmission path for forward traveling is established, change of the rotational speed of the drive power source which is raised along with the downshift is set to a larger value than that in the case where the vehicle is traveling in the autonomous driving mode. Therefore, during autonomous driving, change of the rotational speed of the drive power source is relatively small, and the drive power source brake is smoothly or gently applied. During manual driving, on the other hand, change of the rotational speed of the drive power source is relatively large, and the drive power source brake is applied with good response.

The electronic control unit may be configured to shift the transmission such that the shift time during the manual driving is shorter than the shift time during the autonomous driving, when the power transmission path is switched between the power transmission path for forward traveling and the power transmission path for reverse traveling.

According to the above aspect of the disclosure, if the vehicle is traveling in the manual driving mode, when the transmission is shifted so as to be switched between the condition where the power transmission path for forward traveling is formed, and the condition where the power transmission path for reverse traveling is formed, the shift time is set to a shorter time than that in the case where the vehicle is traveling in the autonomous driving mode. Therefore, during autonomous driving, shift shock at the time of forward/reverse switching is suppressed. On the other hand, during manual driving, the shift response at the time of forward/reverse switching is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an operation table indicating the relationship between shifting operation of the automatic transmission, and a combination of operating states of engagement devices used in the transmission;

DETAILED DESCRIPTION OF EMBODIMENTS

Some embodiments of the disclosure will be described in detail with reference to the drawings.

Figure 1:
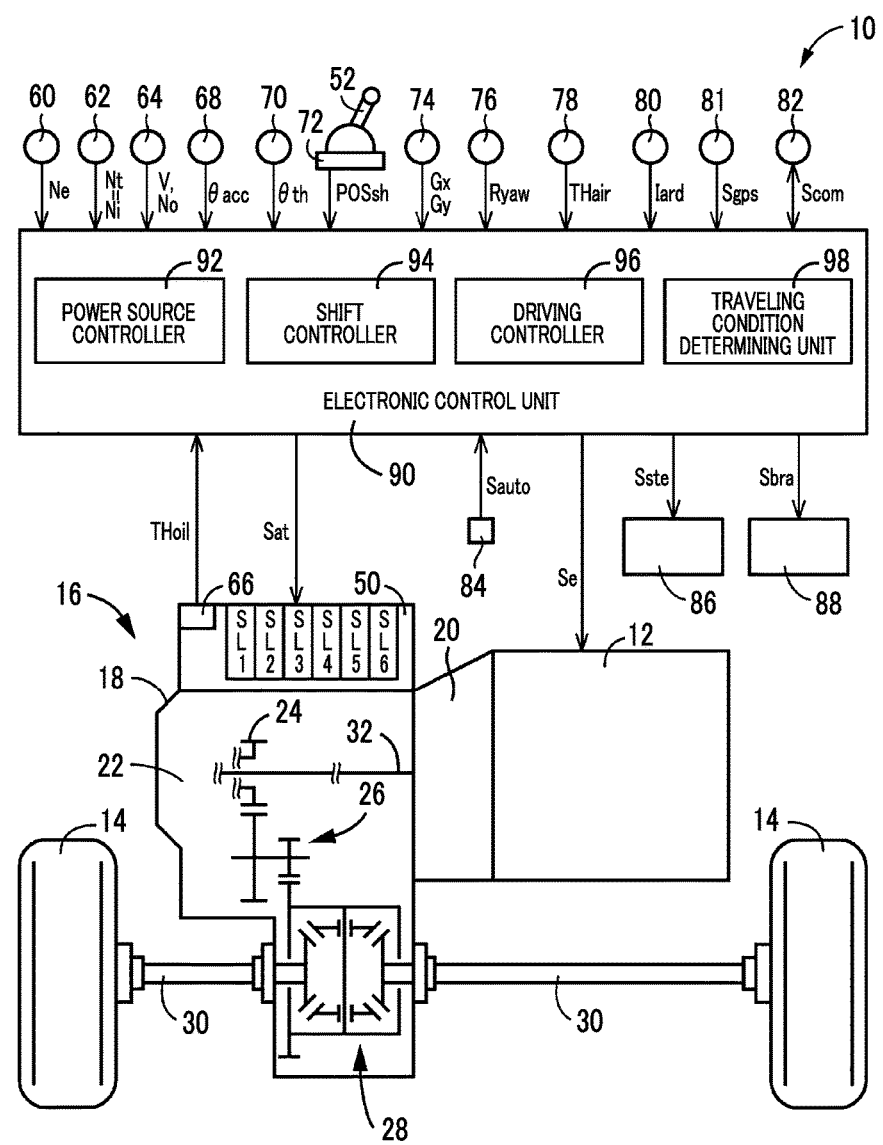
FIG. 1 is a view showing the general configuration of a vehicle to which the disclosure is applied, and also showing a principal part of a control system for controlling each part of the vehicle involved in traveling.

Initially, a first embodiment of the disclosure will be described. FIG. 1 shows the general configuration of a vehicle 10 to which the disclosure is applied, and also shows a principal part of a control system for controlling each part of the vehicle 10 involved in traveling. In FIG. 1, the vehicle 10 includes an engine 12, drive wheels 14, and a power transmission unit 16 provided in a power transmission path between the engine 12 and the drive wheels 14. The power transmission unit 16 includes a torque converter 20, automatic transmission 22, reduction gear mechanism 26 coupled to a transmission output gear 24 as an output rotating member of the automatic transmission 22, differential gear (differential gear unit) 28 coupled to the reduction gear mechanism 26, and so forth, which are housed in a case 18 as a non-rotating member mounted on the vehicle body. The power transmission unit 16 also includes a pair of drive shafts (axles) 30 coupled to the differential gear 28. In the power transmission unit 16, power (which is equivalent to torque or force when they are not particularly distinguished from each other) delivered from the engine 12 is transmitted to the drive wheels 14, via the torque converter 20, automatic transmission 22, reduction gear mechanism 26, differential gear 28, drive shafts 30, etc., in this order.

The engine 12 is a drive power source (that is equivalent to a power source) of the vehicle 10, and is a known internal combustion engine, such as a gasoline engine or a diesel engine. In operation, operating conditions, such as the intake air amount, fuel supply amount, and the ignition timing, of the engine 12 are controlled by an electronic control unit 90 that will be described later, so that engine torque Te is controlled.

Figure 2:
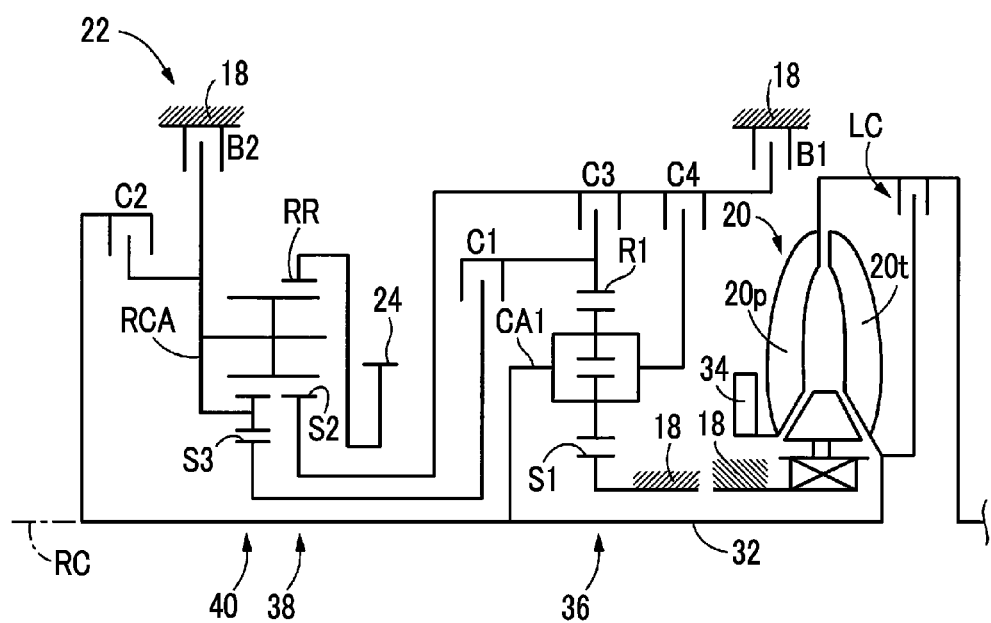
FIG. 2 is a skeleton diagram showing one example of a torque converter and an automatic transmission.

FIG. 2 is a skeleton diagram showing one example of the torque converter 20 and the automatic transmission 22. The torque converter 20 and the automatic transmission 22 are generally symmetrically arranged with respect to an axis RC of a transmission input shaft 32 as an input rotating member of the automatic transmission 22, and the lower halves of these components 20, 22 below the axis RC are not illustrated in FIG. 2.

In FIG. 2, the torque converter 20 is disposed in a power transmission path between the engine 12 and the automatic transmission 22, such that it rotates about the axis RC. The torque converter 20 is a hydraulic power transmission device including a pump impeller 20$p$ coupled to the engine 12, a turbine wheel 20$t$ coupled to the transmission input shaft 32, and so forth. The transmission input shaft 32 is also a turbine shaft that is rotated/driven by the turbine wheel 20$t$. The power transmission unit 16 also includes a lockup clutch LC that can directly couple between the pump impeller 20$p$ and the turbine wheel 20$t$ (namely, input and output rotating members of the torque converter 20). The power transmission unit 16 also includes a mechanical oil pump 34 coupled to the pump impeller 20$p$. The oil pump 34 is rotated or driven by the engine 12, so as to discharge hydraulic oil used for shift control of the automatic transmission 22, and for supplying lubricating oil to each part of the power transmission unit 16. Namely, the hydraulic oil pumped up by the oil pump 34 is supplied as an original pressure of a hydraulic control circuit 50 (see FIG. 1) included in the vehicle 10.

The automatic transmission 22 is a stepwise variable transmission that provides a part of the power transmission path between the engine 12 and the drive wheels 14. The automatic transmission 22 is a planetary gear type multi-speed transmission having two or more planetary gear sets and two or more engagement devices. More specifically, the automatic transmission 22 has a double-pinion first planetary gear set 36, single-pinion second planetary gear set 38, and a double-pinion third planetary gear set 40. The single-pinion second planetary gear set 38, and the double-pinion third planetary gear set 40 configure Ravigneaux-type. The double-pinion first planetary gear set 36, the single-pinion second planetary gear set 38, and the double-pinion third planetary gear set 40 are arranged on the same axis (the axis RC). The automatic transmission 22 also has two or more engagement devices (which will be simply referred to as "engagement devices C" when they are not particularly distinguished), more specifically, a first clutch C1, second clutch C2, third clutch C3, fourth clutch C4, first brake B1, and a second brake B2.

Each of the engagement devices C is a hydraulic friction device, which is provided by a wet multiple-disc clutch or brake adapted to be pressed by a hydraulic actuator, or a band brake adapted to be pulled and tightened by a hydraulic actuator, or the like. To switch the operating states (such as engaged and released states) of the engagement devices C, the torque capacity (clutch torque) Tc (namely, clutch torque Tc1, Tc2, Tc3, Tc4, Tb1, Tb2) of each of the engagement devices C is changed by a hydraulic pressure (clutch pressure) Pc (namely, clutch pressure Pc1, Pc2, Pc3, Pc4, Pb1, Pb2) delivered from a corresponding one of solenoid valves SL1-SL6, etc. within the hydraulic control circuit 50.

In the automatic transmission 22, selected ones of rotating elements (sun gears S1, S2, S3, carriers CA1, RCA, ring gears R1, RR) of the first planetary gear set 36, second planetary gear set 38, and the third planetary gear set 40 are coupled to each other, directly or indirectly (or selectively) via the engagement device C, or coupled to the transmission input shaft 32, case 18, or the transmission output gear 24.

The electronic control unit 90 that will be described later controls the operating states of the engagement devices C (namely, engages selected ones of the engagement devices C), according to the accelerating operation performed by the driver, and the vehicle speed V, for example, so that the automatic transmission 22 is placed in a selected one of a plurality of gear positions having different gear ratios (speed ratios) γ (=AT input rotational speed Ni/AT output rotational speed No). As shown in the engagement operation table of FIG. 3, for example, the automatic transmission 22 is placed in a selected one of eight forward gear positions, i.e., a first-speed gear position "1st" through an eighth-speed gear position "8th", and one reverse gear position "Rev". In this connection, the AT input rotational speed Ni is the rotational speed of the transmission input shaft 32, and the AT output rotational speed No is the rotational speed of the transmission output gear 24. The gear ratio γ of the automatic transmission 22 corresponding to each gear position is determined by each gear ratio (=the number of teeth of the sun gear/the number of teeth of the ring gear) ρ1, ρ2, ρ3 of the first planetary gear set 36, second planetary gear set 38, and the third planetary gear set 40. The gear ratio γ is the largest ratio when the automatic transmission 22 is in the first-speed gear position "1st", and is reduced as the gear position changes to the higher vehicle speed side (becomes closer to the eight-speed gear position "8th").

The engagement operation table of FIG. 3 shows the relationship between each gear position formed in the automatic transmission 22, and the operating state of each of the engagement devices C. In FIG. 3, "O" represents the engaged state, and blank space represents the released state. As shown in FIG. 3, selected ones of the engagement devices C are engaged, so that each gear position of the eight forward gear positions ("1st"-"8th") and one reverse gear position "Rev" is selectively formed. For example, the first-speed gear position "1st" is formed by engaging the first clutch C1 and the second brake B2, as the selected engagement devices. When all of the engagement devices C are released, the automatic transmission 22 is placed in a neutral condition where none of the gear positions is formed (namely, a neutral condition in which power transmission is interrupted).

Referring back to FIG. 1, the vehicle 10 further includes the electronic control unit 90 including a traveling controller that controls each part involved in traveling. The electronic control unit 90 includes a so-called microcomputer having CPU, RAM, ROM, input and output interfaces, etc., for example, and the CPU performs signal processing according to programs stored in advance in the ROM, while utilizing the temporary storage function of the RAM, so as to perform various controls of the vehicle 10. For example, the electronic control unit 90 performs output control of the engine 12, shift control of the automatic transmission 22, and so forth, and includes respective computers for engine control, hydraulic control (shift control), etc. as needed.

The electronic control unit 90 is supplied with various signals, etc. based on detection values obtained by various sensors, etc. included in the vehicle 10. For example, the sensors, etc. include an engine speed sensor 60, input rotational speed sensor 62, output rotational speed sensor 64, oil temperature sensor 66, accelerator pedal stroke sensor 68, throttle opening sensor 70, shift operation position sensor 72, G sensor 74, yaw rate sensor 76, outside air temperature sensor 78, course recognition and obstacle detection sensor 80, such as a vehicle-mounted camera, GPS antenna 81, antenna 82 for outside network communications, autonomous driving selection switch 84 that allows the driver to select autonomous driving, and so forth. The above-mentioned various signals include, for example, signals indicative of the engine speed Ne, AT input rotational speed Ni as the rotational speed of the turbine shaft (i.e., turbine rotational speed Nt), AT output rotational speed No corresponding to the vehicle speed V, hydraulic oil temperature THoil as the temperature of hydraulic oil in the hydraulic control circuit 50, accelerator pedal stroke θacc as the amount of accelerating operation by the driver (i.e., the amount of operation of the accelerator pedal) which represents the magnitude of accelerating operation by the driver, throttle opening θth as the opening of the electronic throttle valve, operation position POSsh of a shift lever 52 as a shifting member included in the vehicle 10, longitudinal acceleration Gx of the vehicle 10, lateral acceleration Gy of the vehicle 10, yaw rate Ryaw as the angular velocity of rotation about the vertical axis of the vehicle 10, and the outside air temperature THair around the vehicle 10, vehicle surrounding information Iard, GPS signal (orbit signal) Sgps, communication signal Scom, autonomous driving selection signal Sauto, and so forth. Also, various command signals are generated from the electronic control unit 90, to respective devices included in the vehicle 10. For example, the devices include the engine 12, hydraulic control circuit 50, antenna 82 for outside network communications, steering actuator 86, brake actuator 88, and so forth. The above-mentioned various command signals include, for example, an engine control command signal Se for controlling the engine 12, hydraulic control command signal Sat for controlling the operating states of the engagement devices C (namely, for controlling shifting of the automatic transmission 22), communication signal Scom, steering signal Sste for operating the steering actuator 86 that controls steering of the wheels (in particular, front wheels), brake signal Sbra for operating the brake actuator 88 that controls foot brake, and so forth. The hydraulic control command signal Sat is a command signal (hydraulic command value, command pressure) for driving each solenoid valve SL1-SL6 that regulates each clutch pressure Pc supplied to a hydraulic actuator of each of the engagement devices C, and is generated to the hydraulic control circuit 50.

The operation position POSsh of the shift lever 52 is, for example an operation position selected from "P", "R", "N", "D", "B", etc. The operation position "P" is a parking operation position P (which will be called "P operation position") for selecting the parking position (P position) of the automatic transmission 22, and bringing the automatic transmission 22 into a neutral position in which the power transmission path is disconnected (namely, a neutral condition in which power cannot be transmitted through the power transmission path between the engine 12 and the drive wheels 14 with the engagement devices C released) while inhibiting (locking) rotation of the transmission output gear 24. The operation position "R" is a reverse-drive operation position R (which will be called "R operation position") for selecting the reverse-drive position (R position) of the automatic transmission 22 so that the vehicle travels in the reverse direction. Namely with the shift lever 52 operated to the R operation position, a power transmission path for reverse traveling is formed between the engine 12 and the drive wheels 14, through engagement of the engagement devices C selected for forming the reverse gear position of the automatic transmission 22. The R operation position is a traveling operation position that permits reverse traveling, using the reverse gear position "Rev" of the automatic transmission 22. The operation position "N" is a neutral operation position N (which will be called "N operation position") for selecting the neutral position (N position) of the automatic transmission 22, and placing the automatic transmission 22 in a neutral condition. The P operation position and the N operation position are non-traveling operation positions in which the vehicle is unable to travel with power of the engine 12. The operation position "D" is a forward-drive operation position D (which will be called "D operation position") for selecting the forward-drive position (D position) of the automatic transmission 22, so that the vehicle travels in the forward direction. Namely, with the shift lever 52 operated to the D operation position, a power transmission path for reverse traveling is formed between the engine 12 and the drive wheels 14, through engagement of the engagement devices C selected for forming any forward gear position of the automatic transmission 22. The D operation position is a traveling operation position in which automatic shift control is performed, using all of the forward gear positions from the first-speed gear position "1st" to the eighth-speed gear position "8th", within a shift range (D range) in which shifting of the automatic transmission 22 is permitted, so as to enable the vehicle to travel forward. The operation position "B" is an engine brake operation position B (which will be called "B operation position") for selecting the engine brake position (B position) of the automatic transmission 22, and establishing a condition (a condition where the effect of engine brake can be more strongly obtained) in which an engine brake is more likely to be applied as a drive power source brake using the engine 12, in a condition where power can be transmitted through a power transmission path for forward traveling, as compared with that in the D position. For example, in the B operation position, a gear position that is on the lower vehicle speed side (on the lower side) by one speed (or two or more speeds) in the automatic transmission 22, than the gear position formed in the D operation position. Accordingly, if the shift lever 52 is switched from the D operation position to the B operation position (namely, if D→B switching operation is performed), a request (D→B position switching request) for switching the automatic transmission 22 from the D position to the B position is generated, and the automatic transmission 22 is shifted down. Thus, the shift lever 52 functions as a switching operation member that is manually operated so that a request for switching the shift positions of the automatic transmission 22 is received.

The electronic control unit 90 includes a power source controller 92, shift controller 94, and a driving controller 96, so as to implement control functions for various controls in the vehicle 10.

The power source controller 92 calculates required driving force Fdem, by applying the accelerator pedal stroke θacc and the vehicle speed V (equivalent to the AT output rotational speed No), to a predetermined relationship (e.g., a driving force map) empirically obtained or obtained by design in advance and stored, for example. The power source controller 92 sets a target engine torque Tetgt that provides the required driving force Fdem, in view of a transmission loss, load of accessories, gear ratio γ of the automatic transmission 22, etc., and the engine control command signal Se for use in output control of the engine 12 is generated to the throttle actuator, fuel injection devices, ignition devices, etc., so that the target engine torque Tetgt can be obtained.

The shift controller 94 shifts the automatic transmission 22 according to traveling conditions. More specifically, when the operation position POSsh of the shift lever 52 is the D operation position, the shift controller 94 determines whether shifting of the automatic transmission 22 is to be executed, by determining the presence or absence of execution of control for switching the gear positions of the automatic transmission 22, using a predetermined relationship (shift map, shift diagram), for example. The shift controller 94 determines whether shifting of the automatic transmission 22 is to be executed, (namely, determines the gear position to be formed in the automatic transmission 22), by applying a value related to the vehicle speed and the amount of drive request, to the above-mentioned shift map. The shift controller 94 outputs a shift command for engaging and/or releasing the engagement devices C involved in shifting of the automatic transmission 22, as a hydraulic control command signal Sat, to the hydraulic control circuit 50, so as to form the gear position thus determined.

In the shift map, shift lines based on which shifting of the automatic transmission 22 is determined are plotted on two-dimensional coordinates having the vehicle-speed related value and the drive request amount as variables. The shift lines on the shift map include upshift lines based on which upshifting is determined, and downshift lines based on which downshifting is determined. Each of the upshift lines and downshift lines is set in advance between adjacent gear positions (that are different by one speed from each other) of the plurality of gear positions that can be formed in the D position of the automatic transmission 22. Each shift line is used for determining whether the actual vehicle-speed related value has crossed the shift line, on a line indicating a given drive request amount, or the actual drive request amount has crossed the shift line, on a line indicating a given vehicle-speed related value, namely, has crossed a value (shift point) on the shift line at which shifting should be executed. Thus, each shift line is set in advance as a series of the shift points. The vehicle-speed related value is the vehicle speed V, or a value related to the vehicle speed V, and may be the vehicle speed V, wheel speed, AT output rotational speed No, or the like. The drive request amount is a value representing the magnitude of drive request made by the driver on the vehicle 10, and may be the above-indicated required driving force Fdem [N], required drive torque [Nm] or required drive power [W] related to the required driving force Fdem, or the like. As the drive request amount, the accelerator pedal stroke θacc [%], throttle opening θth [%], intake air amount [g/sec], or the like, may also be simply used.

The shift controller 94 performs so-called clutch-to-clutch shifting, by switching the engagement states of certain engagement devices involved in shifting of the automatic transmission 22, as the selected ones of the engagement devices C, (namely, by switching the engaged and released states of the selected engagement devices), upon shifting of the automatic transmission 22. For example, in a 3→2 downshift from the third-speed gear position "3rd" to the second-speed gear position "2nd", switching of the engagement state is performed between the third clutch C3 and the first brake B1 (namely, clutch-to-clutch shifting is performed by releasing the third clutch C3 and engaging the first brake B1).

When the operation position POSsh of the shift lever 52 is the R operation position, the shift controller 94 outputs a command for engaging both the third clutch C3 and the second brake B2, as a hydraulic control command signal Sat, to the hydraulic control circuit 50, so as to form the reverse gear position "Rev". Accordingly, when the shift lever 52 is switched between the D operation position and the R operation position (namely, when D→R switching operation or R→D switching operation is performed), the shift controller 94 outputs a hydraulic control command signal Sat for shifting the automatic transmission 22, to the hydraulic control circuit 50, so as to switch the automatic transmission 22 between the forward gear position (in particular, the first-speed gear position "1st") and the reverse gear position "Rev", namely, to switch the automatic transmission 22 between a condition (i.e., the D position of the automatic transmission 22) where the power transmission path for forward traveling is formed, and a condition (i.e., the R position of the automatic transmission 22) where the power transmission path for reverse traveling is formed.

When D→B switching operation is performed on the shift lever 52, the shift controller 94 outputs a hydraulic control command signal Sat for shifting down the automatic transmission 22 into a condition where the effect of engine brake can be more strongly obtained when the automatic transmission 22 is in the D position, to the hydraulic control circuit 50.

When a request for switching of the shift positions or gear positions of the automatic transmission 22 is generated during autonomous driving under control of the driving controller 96, the shift controller 94 outputs a hydraulic control command signal Sat for shifting the automatic transmission 22, to the hydraulic control circuit 50, so as to form the shift position or gear position requested with the switching request.

The driving controller 96 switches the vehicle 10 between an autonomous driving mode under autonomous driving control, and a manual driving mode under driving operation by the driver. The manual driving mode is a driving method (driving mode) for running the vehicle 10 through driving operation, such as accelerating operation, braking operation, steering operation, etc. performed by the driver. The autonomous driving mode is a driving method for running the vehicle 10 by automatically effecting acceleration or deceleration, braking, steering, etc. under control of the electronic control unit 90, based on signals from various sensors and information, irrespective of the driving operation (intention) of the driver.

More specifically, the driving controller 96 executes the manual driving mode when the autonomous driving mode is not selected with the autonomous driving selection switch 84, and executes the autonomous driving mode when the autonomous driving selection switch 84 is operated by the driver, and the autonomous driving mode is selected. When the driving controller 96 determines that any driving operation, such as accelerating operation, braking operation, or steering operation, has been performed by the driver, during autonomous driving, the controller 96 switches the vehicle 10 to the manual driving mode. Also, when the driving controller 96 determines that an emergency has occurred during autonomous driving, it switches the vehicle 10 to the manual driving mode. The emergency is, for example, a situation where autonomous driving cannot be safely performed due to an abnormality in communications needed for autonomous driving, for example, hacking (hacking into the electronic control unit 90 via communication lines), or an error in sending or receiving of the communication signal Scom. Also, when the driving controller 96 determines that autonomous driving cannot be executed, based on road conditions, during autonomous driving, the controller 96 switches the vehicle 10 to the manual driving mode. When the driving controller 96 temporarily switches the vehicle 10 to the manual driving mode based on road conditions during autonomous driving, and then determines, based on road conditions, that the vehicle 10 can return to the autonomous driving mode, the controller 96 switches the vehicle 10 to the autonomous driving mode. When the autonomous driving selection switch 84 is operation by the driver, and the autonomous driving mode is selected, in a condition where occurrence of an emergency is determined, during manual driving, the driving controller 96 inhibits switching to the autonomous driving mode, and keeps the vehicle 10 in the manual driving mode.

The driving controller 96 outputs respective commands for controlling the engine 12 and the automatic transmission 22, to the power source controller 92 and the shift controller 94, based on signals from various sensors, and other information, and also operates the steering actuator 86 and the brake actuator 88, so as to perform autonomous driving.

In the meantime, if shift control is performed with emphasis placed on suppression of shock, during shifting of the automatic transmission 22, the shifting may suffer from poor response. While smooth traveling with reduced shock is desirable during autonomous driving, shifting with good response according to the driver's intention to accelerate or decelerate the vehicle is deemed desirable during manual driving.

Thus, in order to achieve shifting of the automatic transmission 22 in a manner suitable for each of autonomous driving and manual driving, when the automatic transmission 22 is shifted, the shift controller 94 sets the shift time Tsh required for shifting of the automatic transmission 22, to a shorter time in the case where the vehicle 10 is traveling in the manual driving mode, than that in the case where the vehicle 10 is traveling in the autonomous driving mode. The shift time Tsh is a period of time from a point at which the hydraulic control command signal Sat for switching the operating states of the engagement devices C, which are to be switched during shifting of the automatic transmission 22, starts being generated, to a point at which switching of the operating states is completed, for example.

The shift controller 94 shortens the shift time Tsh, by increasing the rate of change (<0) at which the hydraulic command value of the engagement device switched to the released state during shifting is gradually reduced, advancing a point in time at which the hydraulic command value of the engagement device switched to the engaged state during shifting is gradually increased, in accordance with increase in the rate of reduction of the hydraulic pressure in the engagement device switched to the released state, and/or increasing the rate of change (>0) at which the hydraulic command value of the engagement device switched to the engaged state during shifting is gradually increased.

The electronic control unit 90 further includes a traveling condition determining unit 98, so as to achieve shifting of the automatic transmission 22 as described above.

The traveling condition determining unit 98 determines whether it is the time for the shift controller 94 to shift the automatic transmission 22, namely, whether there is a request for shifting of the automatic transmission 22 (i.e., a shift request for the automatic transmission 22). The automatic transmission 22 is shifted by the shift controller 94, when the automatic transmission 22, which is placed in the D position, is subjected to automatic shift control, for example. Namely, the shift request for the automatic transmission 22 is a request for switching of the gear positions in the D position of the automatic transmission 22, for example. The traveling condition determining unit 98 determines whether it is the time for the automatic transmission 22 placed in the D position to be subjected to automatic shift control, namely, whether there is a request for switching of the gear positions in the D position of the automatic transmission 22.

Also, the traveling condition determining unit 98 determines whether the vehicle 10 is traveling in the autonomous driving mode, or in the manual driving mode.

If the traveling condition determining unit 98 determines that the vehicle 10 is traveling in the manual driving mode, when the traveling condition determining unit 98 determines that there is a shift request for the automatic transmission 22 (i.e., there is a request for switching of the gear positions in the D position of the automatic transmission 22, for example), the shift controller 94 sets the shift time Tsh required for shifting of the automatic transmission 22 to a shorter time than that in case where the traveling condition determining unit 98 determines that the vehicle 10 is traveling in the autonomous driving mode.

If the traveling condition determining unit 98 determines that the vehicle 10 is traveling in the autonomous driving mode, when the traveling condition determining unit 98 determines that there is a request for switching of the gear positions in the D position of the automatic transmission 22, the shift controller 94 sets the shift time Tsh to a predetermined time T1. On the other hand, if the traveling condition determining unit 98 determines that the vehicle 10 is traveling in the manual driving mode, when the traveling condition determining unit 98 determines that there is a request for switching of the gear positions in the D position of the automatic transmission 22, the shift controller 94 sets the shift time Tsh to a predetermined time T2 (<T1), which is a shorter time than that in the case where the vehicle 10 is traveling in the autonomous driving mode.

Figure 4:
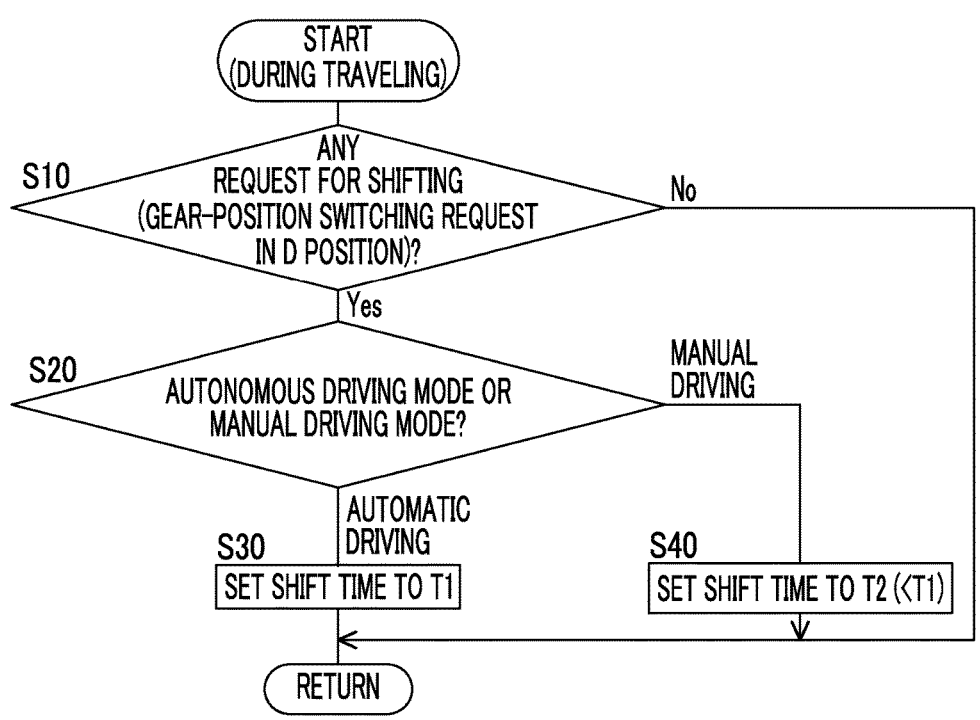
FIG. 4 is a flowchart illustrating a principal part of control operation of an electronic control unit, namely, control operation for achieving shifting of the automatic transmission in a manner suitable for each of autonomous driving and manual driving, according to a first embodiment of the disclosure.

FIG. 4 is a flowchart illustrating a principal part of control operation of the electronic control unit 90, namely, control operation for achieving shifting of the automatic transmission 22 in a manner suitable for each of autonomous driving and manual driving. A control routine of FIG. 4 is repeated executed during traveling, for example.

In FIG. 4, initially in step S10 corresponding to a function of the traveling condition determining unit 98, it is determined whether there is a request for switching of the gear positions in the D position of the automatic transmission 22. If a negative decision (NO) is obtained in step S10, this cycle of the routine ends. If an affirmative decision (YES) is obtained in step S10, it is determined in step S20 corresponding to a function of the traveling condition determining unit 98 whether the vehicle 10 is traveling in the autonomous driving mode, or in the manual driving mode. If it is determined in step S20 that the vehicle 10 is traveling in the autonomous driving mode, the shift time Tsh is set to T1, in step S30 corresponding to a function of the shift controller 94. On the other hand, if it is determined in step S20 that the vehicle 10 is traveling in the manual driving mode, the shift time Tsh is set to T2 (<T1), in step S40 corresponding to a function of the shift controller 94.

As described above, according to this embodiment, when the vehicle 10 is in the manual driving mode at the time of shifting of the automatic transmission 22, the shift time Tsh is set to a shorter time than that in the case where the vehicle 10 is in the autonomous driving mode. Therefore, the shift time Tsh is made relatively long, and shift shock is suppressed, during autonomous driving, whereas the shift time Tsh is made relatively short, and the shift response is improved, during manual driving. It is thus possible to improve the shift response during manual driving, while suppressing shift shock during autonomous driving. Namely, it is possible to achieve shifting of the automatic transmission 22 in a manner suitable for each of autonomous driving and manual driving.

Also, according to this embodiment, when the automatic transmission 22, which is in the D position, is shifted up or down, the shift time Tsh is set to a shorter time if the vehicle 10 is traveling in the manual driving mode, than that in the case where the vehicle 10 is traveling in the autonomous driving mode. Therefore, shift shock can be suppressed when the vehicle 10 is traveling forward in the autonomous driving mode, while the shift response is improved when the vehicle 10 is traveling forward in the manual driving mode.

Next, a second embodiment of the disclosure will be described. In the following description, the same reference numerals are assigned to portions or components that are common to the first and second embodiments.

In the first embodiment as described above, the shift time Tsh is made relatively short during manual driving, so that the shift response during manual driving is improved. When the accelerator pedal stroke θacc that reflects the accelerating operation of the driver (the intention to accelerate the vehicle) is large, during manual operation, it is considered desirable to further improve the shift response.

Thus, in this embodiment, if the accelerating operation amount of the driver (e.g., the accelerator pedal stroke θacc) is large, when the automatic transmission 22 is shifted during manual driving, the shift time Tsh is set to a shorter time than that in the case where the accelerating operation amount is small, in addition to the first embodiment as described above.

More specifically, the traveling condition determining unit 98 determines whether the accelerator pedal stroke θacc is larger than a given pedal stroke α. The given pedal stroke α is a predetermined threshold value used for determining that the accelerating operation amount of the driver is large enough to make it necessary to shorten the shift time Tsh at the time of shifting of the automatic transmission 22, for example.

If the traveling condition determining unit 98 determines that the vehicle 10 is traveling in the manual driving mode when it determines that there is a request for switching of the gear positions in the D position of the automatic transmission 22, and the traveling condition determining unit 98 further determines that the accelerator pedal stroke θacc is equal to or smaller than the given pedal stroke α, the shift controller 94 sets the shift time Tsh to a predetermined time T2 (<T1), which is a shorter time than that in the case where the vehicle 10 is traveling in the autonomous driving mode. On the other hand, if the traveling condition determining unit 98 determines that the vehicle 10 is traveling in the manual driving mode when it determines that there is a request for switching of the gear positions in the D position of the automatic transmission 22, and the traveling condition determining unit 98 further determines that the accelerator pedal stroke θacc is larger than the given pedal stroke α, the shift controller 94 sets the shift time Tsh to a predetermined time T3 (<T2), which is a shorter time than that in the case where the accelerator pedal stroke θacc is equal to or smaller than the given pedal stroke α.

Figure 5:
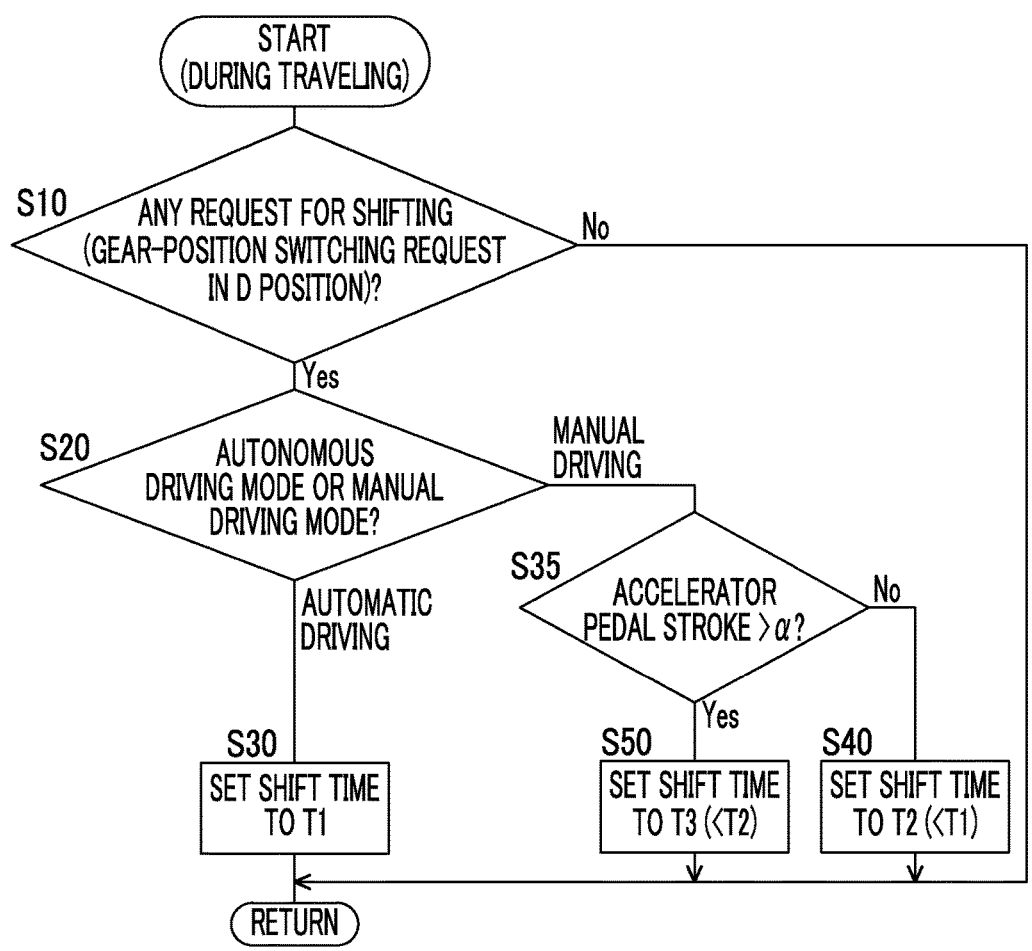
FIG. 5 is a flowchart illustrating a principal part of control operation of the electronic control unit, namely, control operation for achieving shifting of the automatic transmission in a manner suitable for each of autonomous driving and manual driving, according to a second embodiment of the disclosure.

FIG. 5 is a flowchart illustrating a principal part of control operation of the electronic control unit 90, namely, control operation for achieving shifting of the automatic transmission 22 in a manner suitable for each of autonomous driving and manual driving. A control routine of FIG. 5 is repeatedly executed during traveling, for example. The embodiment of FIG. 5 is different from that of FIG. 4.

The flowchart of FIG. 5 is mainly different from that of FIG. 4 in that steps S35 and S50 are added. The difference will be mainly described. In FIG. 5, when it is determined in step S20 that the vehicle 10 is traveling in the manual driving mode, it is determined in step S35 corresponding to a function of the traveling condition determining unit 98 whether the accelerator pedal stroke θacc is larger than the given pedal stroke α. If a negative decision (NO) is obtained in step S35, the shift time Tsh is set to T2 (<T1), in step S40 corresponding to a function of the shift controller 94. On the other hand, if an affirmative decision (YES) is obtained in step S35, the shift time Tsh is set to T3 (<T2), in step S50 corresponding to a function of the shift controller 94.

As described above, according to this embodiment, if the accelerating operation amount of the driver is large when the automatic transmission 22 is shifted during manual driving, the shift time Tsh is set to a shorter time than that in the case where the accelerating operation amount is small. Therefore, it is possible to achieve shifting of the automatic transmission 22 with good response, according to the driver's intention to accelerate the vehicle.

In the first and second embodiments as described above, the shift request for the automatic transmission 22 is the request for switching of the gear positions in the D position of the automatic transmission 22. In a third embodiment as described below, the shift request for the automatic transmission 22 is a request for switching from the D position to the B position.

There is a request for switching from the D position to the B position, when the automatic transmission 22 that is in the D position is shifted down, into a condition where the effect of engine brake is more strongly obtained. When there is a request for switching from the D position to the B position, while the vehicle 10 is traveling in the manual driving mode, it is assumed that the shift lever 52 has been operated from the D operation position to the B operation position, as indicated in the above first embodiment. When there is a request for switching from the D position to the B position, while the vehicle 10 is traveling in the autonomous driving mode, it is assumed that the vehicle 10 travels on a downhill, for example, which requires an engine brake to be applied.

When there is a request for switching from the D position to the B position, the automatic transmission 22 is shifted down, and the engine speed Ne is raised, so that a strong engine-brake effect is obtained. If the engine speed Ne is more quickly raised, the engine-brake effect can be obtained with better response. When the vehicle 10 is traveling in the manual driving mode, it is considered desirable to obtain the engine-brake effect with better response, as compared with the case where the vehicle 10 is traveling in the autonomous driving mode.

Thus, if the vehicle 10 is traveling in the manual driving mode, when the automatic transmission 22 that is in the D position is shifted down into a condition where the effect of engine brake is more strongly obtained, change of the engine speed Ne that is raised along with the downshift of the automatic transmission 22 is made larger than that in the case where the vehicle 10 is traveling in the autonomous driving mode. The shift controller 94 increases the rate of change (>0) at which the hydraulic command value of the engagement device switched to the engaged state on the downshift is gradually increased, so as to increase change of the engine speed Ne.

More specifically, the traveling condition determining unit 98 determines whether it is the time to shift down the automatic transmission 22 that is in the D position, into a condition where the effect of engine brake is more strongly obtained, namely, whether there is a request for the automatic transmission 22 to switch from the D position to the B position.

If the traveling condition determining unit 98 determines that the vehicle 10 is traveling in the autonomous driving mode, when it determines that there is a request for the automatic transmission to switch from the D position to the B position, the shift controller 94 sets the rate of increase of the engine speed Ne that is raised along with the downshift of the automatic transmission 22 is set to a predetermined value A (>0). On the other hand, if the traveling condition determining unit 98 determines that the vehicle 10 is traveling in the manual driving mode, when it determines that there is a request for the automatic transmission 22 to switch from the D position to the B position, the shift controller 94 sets the rate of increase of the engine speed Ne that is raised along with the downshift of the automatic transmission 22 is set to a predetermined value B (>A), which is larger than the rate of increase in the case where the vehicle 10 is traveling in the autonomous driving mode. Thus, during manual driving, an engine brake is applied with better response, as compared with the case where the vehicle 10 is traveling in the automatic traveling mode.

Figure 6:
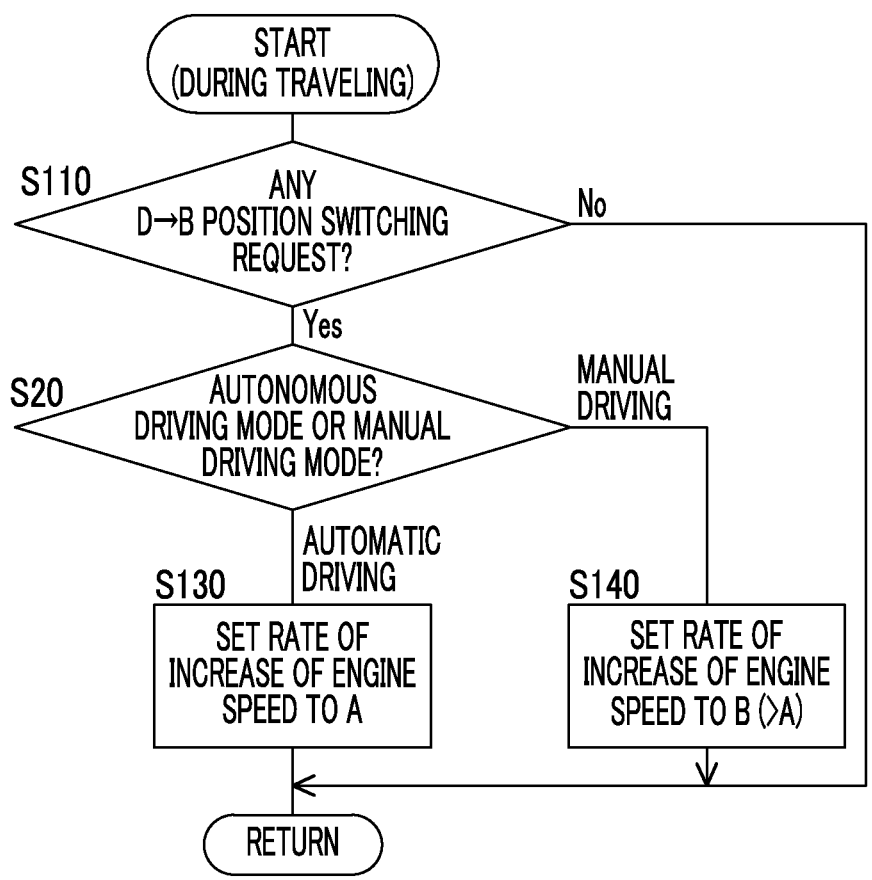
FIG. 6 is a flowchart illustrating a principal part of control operation of the electronic control unit, namely control operation for achieving shifting of the automatic transmission in a manner suitable for each of autonomous driving and manual driving, according to a third embodiment of the disclosure.

FIG. 6 is a flowchart illustrating a principal part of control operation of the electronic control unit 90, namely, control operation for achieving shifting of the automatic transmission 22 in a manner suitable for each of autonomous driving and manual driving. A control routine of FIG. 6 is repeatedly executed during traveling, for example. The embodiment of FIG. 6 is different from that of FIG. 4.

In FIG. 6, initially in step S110 corresponding to a function of the traveling condition determining unit 98, it is determined whether there is a request for the automatic transmission 22 to switch from the D position to the B position. If a negative decision (NO) is obtained in step S110, the current cycle of this routine ends. If an affirmative decision (YES) is obtained in step S110, it is determined in step S20 corresponding to a function of the traveling condition determining unit 98 whether the vehicle 10 is traveling in the autonomous driving mode or the manual driving mode. If it is determined in step S20 that the vehicle 10 is traveling in the autonomous driving mode, the rate of increase of the engine speed Ne that is raised along with the downshift of the automatic transmission 22 is set to A (>0), in step S130 corresponding to a function of the shift controller 94. On the other hand, if it is determined in the above step S20 that the vehicle 10 is traveling in the manual driving mode, the rate of increase of the engine speed Ne that is raised along with the downshift of the automatic transmission 22 is set to B (>A), in step S140 corresponding to a function of the shift controller 94.

As described above, according to this embodiment, when the automatic transmission 22 that is in the D position is shifted down into a condition where the effect of engine brake is more strongly obtained, change of the engine speed Ne that is raised along with the downshift is made larger during manual driving, than that during autonomous driving. Therefore, change of the engine speed Ne is relatively small, and an engine brake is smoothly or gently applied, during autonomous driving, whereas change of the engine speed Ne is relatively large, and an engine brake is applied with good response, during manual driving.

In the first and second embodiments as described above, the shift request for the automatic transmission 22 is the request for switching of the gear positions in the D position of the automatic transmission 22. In a fourth embodiment that will be described below, the shift request for the automatic transmission 22 is a request for switching between forward traveling and reverse traveling.

The automatic transmission 22 is shifted by the shift controller 94, for example, when the automatic transmission 22 is shifted between the D position and the R position. Namely, one example of the shift request for the automatic transmission 22 is a forward/reverse switching request made to the automatic transmission 22, namely, a request for switching the automatic transmission 22 between a forward gear position (in particular, the first-speed gear position "1st") and the reverse gear position "Rev".

If the vehicle 10 is traveling in the manual driving mode, when there is a forward/reverse switching request, it is assumed that the shift lever 52 has been operated from the D operation position to the R operation position, or from the R operation position to the D operation position. If the vehicle 10 is traveling in the autonomous driving mode, when there is a forward/reverse drive switching request, it is assumed that the automatic transmission 22 is switched between the forward gear position and the reverse gear position by an automatic parking system, for example.

In switching (namely, in forward/reverse drive switching) between the forward gear position and the reverse gear position, it is considered desirable to smoothly switch the gear positions with reduced shock, during autonomous driving, and to switch the gear positions with good response, during manual driving.

Thus, if the vehicle 10 is traveling in the manual traveling mode when the automatic transmission 22 is shifted so as to be switched between the D position and the R position, the shift controller 94 sets the shift time Tsh to a shorter time than that in the case where the vehicle 10 is traveling in the automatic traveling mode. The shift time Tsh mentioned herein is a period of time required for switching between the forward gear position and the reverse gear position, namely, forward/reverse switching completion time.

More specifically, the traveling condition determining unit 98 determines whether it is the time to shift the transmission 22 so as to switch the automatic transmission 22 between the D position and the R position, namely, whether there is a request for switching the automatic transmission 22 between the forward and reverse gear positions.

If the traveling condition determining unit 98 determines that the vehicle 10 is traveling in the autonomous driving mode, when the traveling condition determining unit 98 determines that there is a request for switching the automatic transmission 22 between the forward and reverse gear positions, the shift controller 94 sets the shift time Tsh to a predetermined time T1. On the other hand, if the traveling condition determining unit 98 determines that the vehicle 10 is traveling in the manual driving mode, when the traveling condition determining unit 98 determines that there is a request for switching the automatic transmission 22 between the forward and reverse gear positions, the shift controller 94 sets the shift time Tsh to a predetermined time T2 (<T1), which is a shorter time than that in the case where the vehicle 10 is traveling in the autonomous driving mode.

Figure 7:
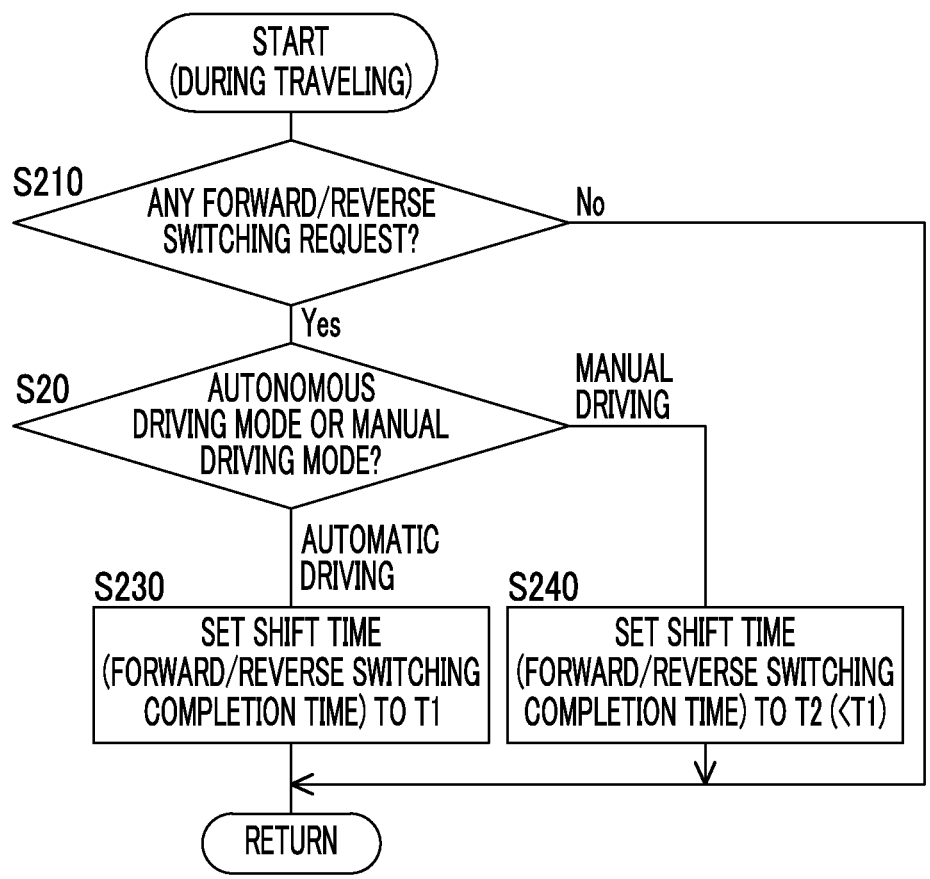
FIG. 7 is a flowchart illustrating a principal part of control operation of the electronic control unit, namely control operation for achieving shifting of the automatic transmission in a manner suitable for each of autonomous driving and manual driving, according to a fourth embodiment of the disclosure.

FIG. 7 is a flowchart illustrating a principal part of control operation of the electronic control unit 90, namely, control operation for achieving shifting of the automatic transmission 22 in a manner suitable for each of autonomous driving and manual driving. A control routine of FIG. 7 is repeatedly executed during traveling, for example. The embodiment of FIG. 7 is different from that of FIG. 4.

In FIG. 7, initially in step S210 corresponding to a function of the traveling condition determining unit 98, it is determined whether there is a request for switching the automatic transmission 22 between the forward and reverse gear positions. If a negative decision (NO) is obtained in step S210, the current cycle of this routine ends. If an affirmative decision (YES) is obtained in step S210, it is determined in step S20 corresponding to a function of the traveling condition determining unit 98 whether the vehicle 10 is traveling in the autonomous driving mode, or the manual driving mode. If it is determined in step S20 that the vehicle 10 is traveling in the autonomous driving mode, the shift time (forward/reverse switching completion time) Tsh is set to T1, in step S230 corresponding to a function of the shift controller 94. On the other hand, when it is determined in step S20 that the vehicle 10 is traveling in the manual driving mode, the shift time (forward/reverse switching completion time) Tsh is set to T2 (<T1), in step S240 corresponding to a function of the shift controller 94.

As described above, according to this embodiment, if the vehicle 10 is traveling in the manual driving mode, when the automatic transmission 22 is shifted so as to be switched between the D position and the R position, the shift time Tsh is set to a shorter time than that in the case where the vehicle 10 is traveling in the autonomous driving mode. Therefore, shift shock at the time of forward/reverse switching is suppressed during autonomous driving, whereas the shift response at the time of forward/reverse switching is improved during manual driving.

While some embodiments of the disclosure have been described in detail based on the drawings, the disclosure may be applied in other forms.

In the above-described embodiments, each of the embodiments is carried out independently. However, each of the embodiments is not necessarily carried out independently, but two or more embodiments may be combined as appropriate, and carried out.

In the first, second and fourth embodiments as described above, the shift time Tsh is set to a shorter time when the vehicle is traveling in the manual traveling mode, than that in the case where the vehicle is traveling in the autonomous driving mode. However, the disclosure is not limited to this mode of control. For example, as in the third embodiment, change of the engine speed Ne that is changed along with shifting of the automatic transmission 22 may be made larger when the vehicle is traveling in the manual driving mode, than that in the case where the vehicle is traveling in the autonomous driving mode. Accordingly, the shift time Tsh may not be the period of time from a point at which the hydraulic control command signal Sat starts being generated to a point at which switching of the operating states of the engagement devices C is completed. For example, the shift time Tsh may be the time of the inertia phase in a transient process of shifting, for example.

In the first, second and fourth embodiments as described above, T1, T2, T3 are used by way of example as values of the shift time Tsh. These values are used for comparing the length of the shift time Tsh, and each of T1, T2, T3 does not assume the same value (numerical value) in each of the embodiments. In each embodiment, T1, T2, T3 are respectively set as appropriate in accordance with the embodiment.

In the first and second embodiments as described above, the automatic transmission 22 is shifted, for example, when automatic shift control is performed on the automatic transmission 22 that is in the D position. However, the disclosure is not limited to this mode of control. For example, when the vehicle is in the manual driving mode, the automatic transmission 22 may be shifted when manual shift control is performed, namely, when the gear position of the automatic transmission 22 is switched or changed according to the driver's operation of the shift lever 52, or a paddle switch installed on the steering wheel, in a condition where power can be transmitted via a power transmission path for forward traveling.

In the above-described embodiments, the vehicle is basically operated in the autonomous driving mode, by automatically performing actions, such as running (acceleration/deceleration), turning (steering), stopping (braking), etc. through control operation by the electronic control unit 90, without depending on driving operation (accelerating operation, steering operation, braking operation) of the driver. However, the disclosure is not limited to this mode of autonomous driving. For example, the autonomous driving mode may include known cruise control, i.e., controlling drive torque so that the vehicle speed follows a set vehicle speed, while taking account of a distance from a forward vehicle, or the like.

While each gear position of the forward 8-speed gear positions is formed in the automatic transmission 22 in the above-described embodiments, the disclosure is not limited to this arrangement. The automatic transmission 22 may be any type of stepwise variable transmission in which a plurality of gear positions having different gear ratios are selectively formed. The automatic transmission may be selected from, for example, a planetary gear type automatic transmission like the automatic transmission 22, a synchromesh, parallel two-shaft automatic transmission, a known DCT (Dual Clutch Transmission) that is one type of the synchromesh, parallel two-shaft automatic transmission and includes two lines of input shafts, a continuously variable transmission, an electric continuously variable transmission, a transmission in which a continuously variable transmission (electric continuously variable transmission an a stepwise variable transmission are connected (arranged) in series in a power transmission path, and so forth. In sum, the disclosure may be applied to any type of transmission provided that the transmission provides a part of the power transmission path between the drive power source and the drive wheels. When the transmission is a continuously variable transmission, shifting of the transmission is not switching of the gear positions, but change of a target speed ratio to the extent corresponding to change of the gear ratio through switching of the gear positions, or switching between formation of a power transmission path for forward traveling and formation of a power transmission path for reverse traveling, for example.

While the engine 12 is used as an example of the drive power source of the vehicle 10 in the above-described embodiments, the disclosure is not limited to the use of the engine 12. For example, another motive power source, such as a rotating machine, or a motor, may be employed alone, or in combination with the engine 12, as the drive power source. Accordingly, the disclosure may also be applied to a vehicle including an engine, a transmission that provides a part of a power transmission path between the engine and drive wheels, and a rotating machine coupled to an input rotating member of the transmission such that power can be transmitted to the member. In this type of vehicle, during shifting of the transmission, the rotating machine may be used for controlling the engine speed Ne so as to change it toward a synchronous rotational speed after shifting. Accordingly, the shift time Tsh may be shortened, or the rate of change of the engine speed Ne may be increased, by increasing the rate of change of rotation of the rotating machine during shifting (in particular, during the inertia phase). Also, in the vehicle provided with the rotating machine as the drive power source, braking torque is generated through regeneration control of the rotating machine, so that regenerative brake can be applied as a drive power source brake using the rotating machine.

While control performed by the electronic control unit 90 has been illustrated in the above-described embodiments, the disclosure is not limited to this mode of control. For example, the control of the disclosure may be performed by two or more electronic control units.

It is to be understood that the embodiments as described above are merely exemplary embodiments, and that the disclosure may be embodied with various changes, or improvements, based on the knowledge of those skilled in the art.

What is claimed is:

1. A control device for a vehicle,
the vehicle including a transmission provided in a power transmission path between a drive power source and drive wheels of the vehicle,
the control device comprising
an electronic control unit configured to:
   i) shift the transmission according to traveling conditions;
   ii) switch a driving mode for running the vehicle between autonomous driving under autonomous driving control, and manual driving based on driving operation of a driver of the vehicle; and
   iii) shift the transmission such that a shift time required for shifting of the transmission during the manual driving is less than a shift time required for shifting of the transmission during the autonomous driving.

2. The control device according to claim 1, wherein
the electronic control unit is configured to shift the transmission during the manual driving such that the shift time is decreased as an accelerating operation amount of the driver is increased.

3. The control device according to claim 1, wherein
the electronic control unit is configured to shift the transmission when a power transmission path for forward traveling is established, such that the shift time during the manual driving is less than the shift time during the autonomous driving.

4. The control device according to claim 1, wherein the electronic control unit is configured to downshift the transmission into a condition where an effect of a drive-power-source-braking using the drive power source to provide a braking-effect is increased when a power transmission path for forward traveling is established, such that an increase of rotational speed of the drive power source that occurs with the downshift of the transmission during the manual driving is larger than the increase of the rotational speed of the drive power source that occurs during the autonomous driving.

5. The control device according to claim 1, wherein the electronic control unit is configured to shift the transmission such that the shift time during the manual driving is less than the shift time during the autonomous driving, when the power transmission path is switched between a power transmission path for forward traveling and a power transmission path for reverse traveling.

6. A control method for a vehicle,
the vehicle including a transmission provided in a power transmission path between a drive power source and drive wheels of the vehicle, and
an electronic control unit,
the control method comprising:
  i) shifting the transmission, by the electronic control unit, according to traveling conditions;
  ii) switching a driving mode for running the vehicle, by the electronic control unit, between autonomous driving under autonomous driving control, and manual driving under driving operation of a driver of the vehicle, and
  iii) shifting the transmission, by the electronic control unit, such that a shift time required for shifting of the transmission during the manual driving is less than a shift time required for shifting of the transmission during the autonomous driving.

* * * * *